(12) United States Patent
Zhang et al.

(10) Patent No.: US 10,095,724 B1
(45) Date of Patent: Oct. 9, 2018

(54) PROGRESSIVE CONTINUOUS RANGE QUERY FOR MOVING OBJECTS WITH A TREE-LIKE INDEX

(71) Applicants: Mingjin Zhang, Miami, FL (US); Naphtali Rishe, Miami Beach, FL (US); Weitong Liu, Miami, FL (US); Tao Li, Coral Gables, FL (US)

(72) Inventors: Mingjin Zhang, Miami, FL (US); Naphtali Rishe, Miami Beach, FL (US); Weitong Liu, Miami, FL (US); Tao Li, Coral Gables, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 15/672,884

(22) Filed: Aug. 9, 2017

(51) Int. Cl.
*G06F 7/00* (2006.01)
*G06F 17/30* (2006.01)

(52) U.S. Cl.
CPC .. *G06F 17/30336* (2013.01); *G06F 17/30327* (2013.01)

(58) Field of Classification Search
None
See application file for complete search history.

(56) References Cited

U.S. PATENT DOCUMENTS

| | | | | |
|---|---|---|---|---|
| 5,008,929 A * | 4/1991 | Olsen | ............ | H04M 15/00 370/524 |
| 5,644,763 A * | 7/1997 | Roy | ............ | G06F 17/30327 |
| 5,729,689 A * | 3/1998 | Allard | ............ | H04L 29/12132 707/999.01 |
| 6,108,704 A * | 8/2000 | Hutton | ............ | H04L 1/0083 709/227 |
| 6,131,121 A * | 10/2000 | Mattaway | ............ | H04L 1/0083 709/227 |
| 6,148,295 A * | 11/2000 | Megiddo | ............ | G06F 17/30256 |
| 6,199,112 B1 * | 3/2001 | Wilson | ............ | H04L 29/12028 340/475 |
| 6,411,957 B1 * | 6/2002 | Dijkstra | ............ | G06F 17/30961 707/752 |
| 6,711,562 B1 * | 3/2004 | Ross | ............ | G06F 17/30327 707/741 |

(Continued)

OTHER PUBLICATIONS

Guttman, "R-trees: a dynamic index structure for spatial searching," Proceedings of the 1984 ACM SIGMOD International Conference on Management of data, Jun. 1984, pp. 47-57, vol. 14, No. 2.

(Continued)

*Primary Examiner* — Daniel Kuddus
(74) *Attorney, Agent, or Firm* — Saliwanchik, Lloyd & Eisenschenk

(57) ABSTRACT

Methods for progressive continuous range query (PCRQ) are provided. A method can include using branch-and-bound to index interest points with a tree-index and generating a nearest enter split-point for a root node in the tree-index and adding to min-heap. Next, whether min-heap has more elements and whether a next split-point in min-heap is closer than a destination can be determined. Whether a query point has reached a split-point can be investigated followed by retrieving an entry that has generated the split-point. The split-point can be then be removed from min-heap.

13 Claims, 5 Drawing Sheets

(56) References Cited

U.S. PATENT DOCUMENTS

| | | | | |
|---|---|---|---|---|
| 6,834,278 | B2 * | 12/2004 | Yu | G06F 17/30327 707/737 |
| 8,090,745 | B2 * | 1/2012 | Hayashi | G06F 17/30241 707/797 |
| 8,296,306 | B1 * | 10/2012 | Whang | G06F 7/22 707/752 |
| 2002/0123987 | A1 * | 9/2002 | Cox | G06F 17/30327 |
| 2007/0073897 | A1 * | 3/2007 | Sharifzadeh | G01C 21/343 709/238 |
| 2010/0057792 | A1 * | 3/2010 | Ylonen | G06F 12/0253 707/E17.009 |
| 2010/0106713 | A1 * | 4/2010 | Esuli | G06F 17/30961 707/716 |
| 2011/0060748 | A1 * | 3/2011 | Tian | G06F 7/24 707/752 |
| 2011/0061748 | A1 * | 3/2011 | Mous | F16K 17/30 137/386 |
| 2012/0254251 | A1 * | 10/2012 | Barbosa | G06F 17/3061 707/797 |

OTHER PUBLICATIONS

Sellis et al., "The R+-Tree: a dynamic index for multi-dimensional objects," 1987 International Conference of Very Large Data Bases, Aug. 1987, pp. 1-24.

Beckmann et al., "The R*-tree: an efficient and robust access method for points and rectangles," Proceedings of the 1990 ACM SIGMOD International Conference on Management of Data, Jun. 1990, pp. 322-331, vol. 19, No. 2.

Roussopoulos et al., "Nearest neighbor queries," Proceedings of the 1995 ACM SIGMOD International Conference on Management of Data, May 1995, pp. 71-79, vol. 24, No. 2.

Tao et al., "Time-parameterized queries in spatia-temporal databases," Proceedings of the 2002 ACM SIGMOD International Conference on Management of Data, Jun. 2002, pp. 334-345.

Hjaltason et al., "Incremental distance join algorithms for spatial databases," Proceedings of the 1998 ACM SIGMOD International Conference on Management of Data, Jun. 1998, pp. 237-248, vol. 27, No. 2.

Bespamyatnikh et al., "Queries with segments in voronoi diagrams," Computational Geometry, May 2000, pp. 23-33, vol. 16.

Tao et al., "Continuous nearest neighbor search," Proceedings of the 28th International Conference on Very Large Data Bases, Aug. 2002, pp. 287-298.

Mouratidis et al., "Conceptual partitioning: an efficient method for continuous nearest neighbor monitoring," Proceedings of the 2005 ACM SIGMOD International Conference on Management of Data, Jun. 2005, pp. 634-645.

Kulik et al., "Incremental rank updates for moving query points," 4th International Conference on Geographic Information Science, Sep. 2006, pp. 251-268.

Xuan et al., "Continuous range search query processing in mobile navigation," 2008 14th IEEE International Conference on Parallel and Distributed Systems, Dec. 2008, pp. 361-368.

Lee et al., "An efficient algorithm for predictive continuous nearest neighbor query processing and result maintenance," Proceedings of the 6th International Conference on Mobile Data Management, May 2005, pp. 178-182.

* cited by examiner

US 10,095,724 B1

PROGRESSIVE CONTINUOUS RANGE QUERY FOR MOVING OBJECTS WITH A TREE-LIKE INDEX

STATEMENT OF GOVERNMENT SUPPORT

This invention was made with government support under Grant #1213026 awarded by National Science Foundation. The government has certain rights in the invention.

BACKGROUND

Contemporary technology allows moving object data to be collected easily and extensively. Applications that deal with moving object data (e.g., traffic monitoring, flight control, location-based advertisement and recommendation) typically require Location-Based-Service (LBS), involving querying for the historical, current, or predictive future locations of moving objects. Continuous Range Query (CRQ) is a fundamental technique in the spatial database realm and is very useful in location-based applications. However, existing CRQ methods have drawbacks in that they require extensive computing resources and are slow to return query results.

BRIEF SUMMARY

Embodiments of the present invention include methods for progressive continuous range query (CRQ). In a progressive continuous range query (PCRQ) according to embodiments of the present invention, the first result of a CRQ query can be reported to the user almost instantly and the rest can be gradually produced in the order of distance or time. In embodiments of the present invention, a PCRQ can be resolved by continuously searching for objects within range while a query point is moving along a path (referred to as the query point's trajectory). Said trajectory has a start point and an end point. The start point of said path may be the initial position of the query point, i.e., the position of the query point at the beginning of the resolution of said PCRQ. When the query point is moving along the trajectory, its query range with a radius equal to any given range r sweeps across an area referred to as a query region.

In embodiments of the present invention, the set of points of interest against which queries are made can be organized in a tree-like index. The domain region of a node in a tree-like index is a region that is generated by expanding the boundary of the node, e.g., a minimum bounding rectangle (MBR) in an R-Tree, by range r. When the moving query point is outside of the domain region of a node, it can be safely assumed that the moving point's searching circle does not intersect with the inner cell of the node. This means there is no need to search said cell. Only when the moving query point is within the domain region does the node's cell's data need to be searched to find the data that is located within the moving point's searching circle—this is used to speed up the searching process. Split points are points on the query point's trajectory. The PCRQ result may change only when the query point passes these points. Split points can be divided into two categories—enter split point and exit split point.

Both an enter split point and an exit split point are generated by the intersections of the trajectory of the query point and the domain region of a node. For an interest point A, when the moving query point q passes its enter split point, A enters the query range of q, which can be equivalently stated as: q enters the range of A. Conversely, when q passes its exit split point, A exits the query range of q. When a query point q just passes the enter split point of some point p, p is exactly on the border of the query range. When q passes p's enter split point, p enters the query range. Likewise, when q encounters p's exit split point, p is exactly on the border of the circle with radius r. A query point encounters or reaches a split point when the distance between the query point and the split point is less than or equal to a specified threshold. When q passes p's exit split point, p exits the query range.

Continuous range query (CRQ) is a fundamental technology spatial database and location-based service (LBS) realm. Embodiments of the present invention make CRQ more efficient. The first result of CRQ query can be reported to a user almost instantly and the rest can be gradually produced in the order of distance or time. When the result set is very large, this progressive approach can be especially beneficial since computing and outputting a large result at once can inefficient in terms of time and computing resources.

In methods of the related art, users may be kept waiting for the results for an extended period of time. Furthermore, a user's location could change significantly while waiting for the result pertaining to the previous location, thus possibly making the results irrelevant by the time they are received. Embodiments of the present invention allow for continuous output and maintenance of the predictive query results while the query point is moving. Moreover, the disclosed solution is more scalable than prior art. Generally, a query trajectory (or path) comprises many small line segments. For each segment, the prior art methods need to post a new query, which is inefficient. Unlike said methods, embodiments of the present invention only needs to post one query, a one-time tree traversal for all segments in the path. Embodiments of the present invention can also utilize a tree-like spatial index.

DETAILED DESCRIPTION

To adapt to the requirements of different kinds of queries in practical applications, there are various query types. For example, time-dependent locations and time-dependent extent correlations may be of interest. In these situations, moving points and moving regions are the abstractions. Cars, airplanes, ships, animals and mobile phone users are considered moving points, while forest fires and the spread of epidemic diseases are considered moving regions. One goal of the present invention is to provide a method for a continuous range query (CRQ) for a moving point. CRQ can retrieve all objects of interest within a specified range. The result should change when objects of interest move in or out of range. CRQ is important due to its broad applications. For instance, "If I continue moving in this direction, what will be the gas stations within 0.5 miles for the next 10 minutes?" or "What will be the restaurants within 1 mile at any point during my route from city A to city B?"

Figure 2:
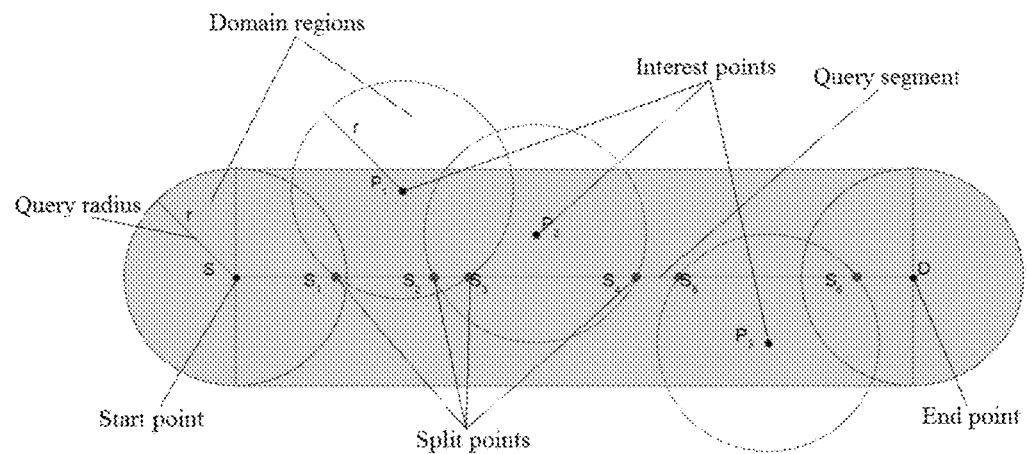
FIG. 2 shows an example of an R-tree index based on Euclidean Distance.

Since CRQ is a fundamental query and is useful in location-based applications, several approaches have been proposed in the past. For example, the R-tree index method based on Euclidean Distance (RED) uses an efficient algorithm to support continuous range queries. In FIG. 2, an R-tree index is used to find all objects within the gray area. Assuming that the query range is radius e, for every object that is found, a circle centered with radius e is drawn. The result can be output after sorting the split-points, or the intersections between the circles and the query line. However, this approach requires loading and sorting all of the candidates at once, which requires extensive memory allocation and CPU overhead. Furthermore, said method is inefficient in practical applications because a moving query point's trajectory (or path) generally comprises many small segments. For each segment, RED-based methods need to post a new query, which is expensive in terms of computing resources. Therefore, the cost of these methods is prohibitive for large numbers of queries in spatial databases due to CPU and memory overhead.

Figure 1:
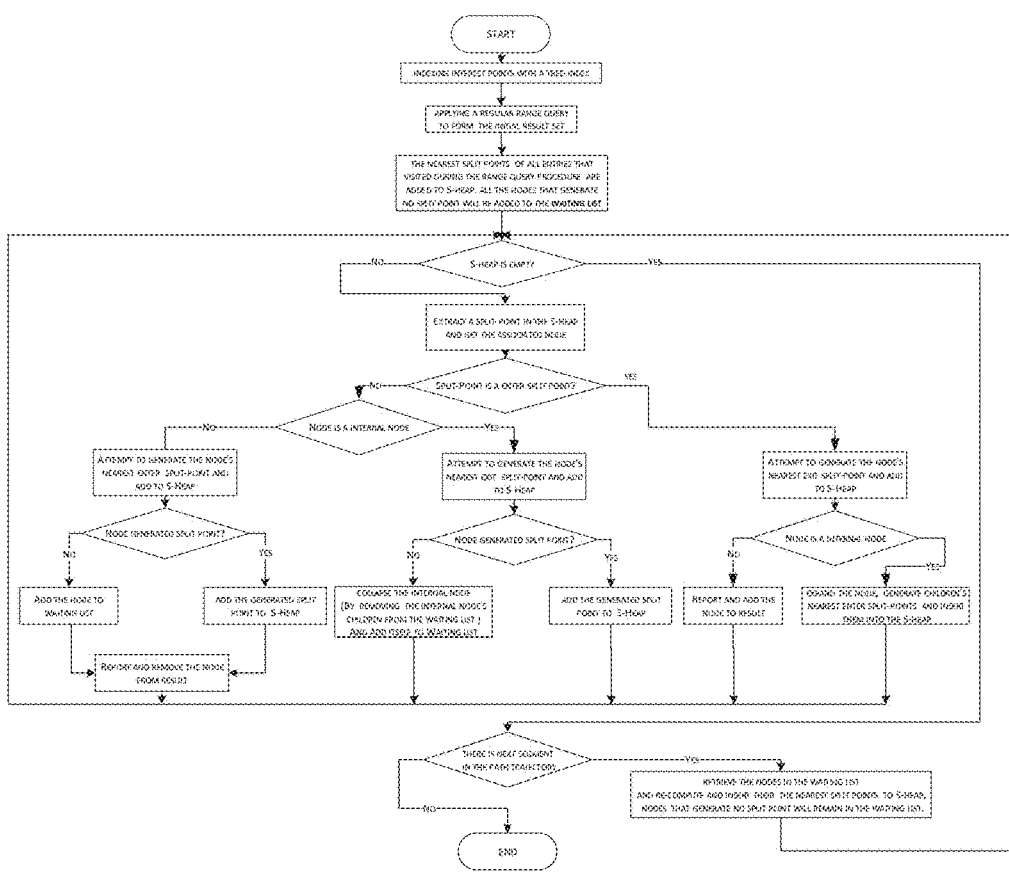
FIG. 1 shows a flowchart of a Progressive Continuous Range Query (CRQ) according to an embodiment of the present invention.
Figure 3:
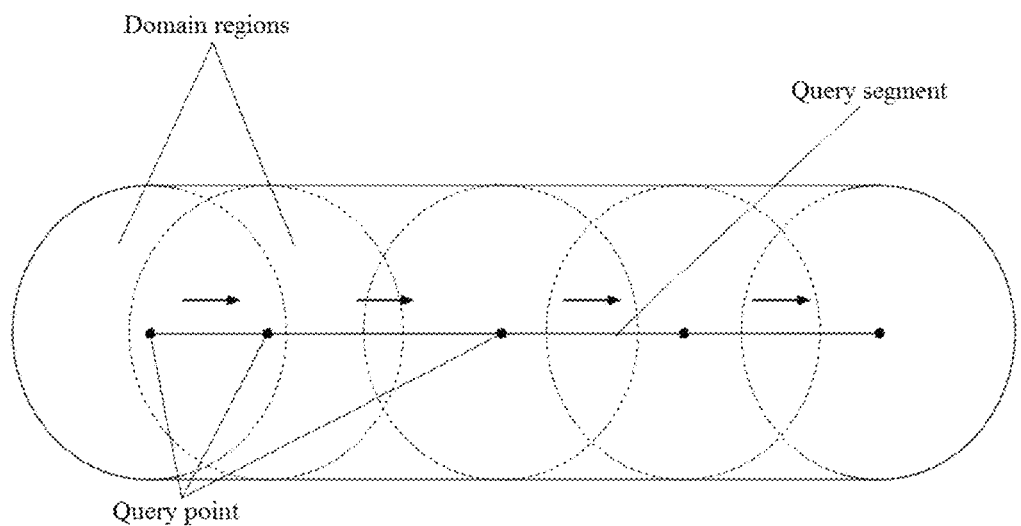
FIG. 3 shows an example of a Continuous Ordered Range Query.
Figure 4:
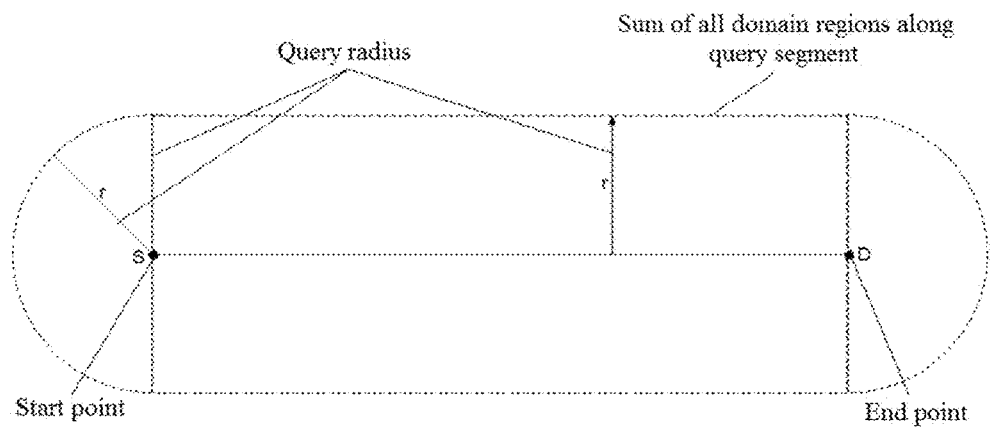
FIG. 4 shows a query region of a Progressive CRQ according to an embodiment of the present invention.

A progressive continuous range query (PCRQ) of the present invention can continuously search for objects within a range r while a point is moving along a specified path. A PCRQ workflow of the present invention with a tree-like index is shown in FIG. 1. FIG. 3 shows a time-slice of a point with a query range moving along an interval. When a query point moves along a given path, its search circle with radius r sweeps across an area defines as the query region. In FIG. 4, the area within the outer dashed line is the query region. In this example, the query region's area is equivalent to the sum of the areas of one rectangle and two semicircles (one full circle). Each element in the result set from a PCRQ query can be expressed as the following two-component tuple: result[i]=<(A, B), (f1, f2, . . . , fm)>(i=0, 1, 2, . . . ).

Figure 5:
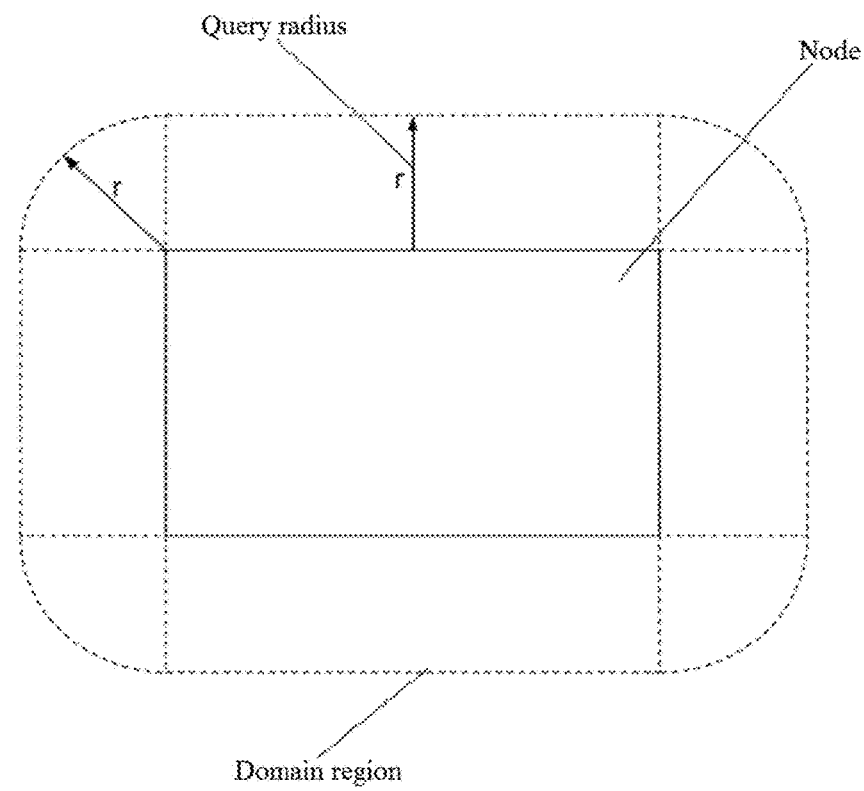
FIG. 5 shows an example of a non-leaf domain region (rounded rectangle).

Points A and B are located in the query segment. This formula states that for an arbitrary point Q between A and B in the query segment, there are m points that fall into the range r (namely, f1, f2, . . . , fm). Embodiments of the present invention include approaches to answer PCRQ queries progressively. The concept of a domain region can be applied to embodiments of the present invention. The domain region of a node is a region that is generated by expanding the boundary of the node, e.g., a minimum bounding rectangle (MBR) in an R-Tree, by range r. This can be viewed as the Murkowski sum of the node boundary and a circle with radius r. There are two situations for domain regions: (1) for leaf nodes (a node that presents one data point), the domain region is represented as a circle centered at the data point with radius r; (2) for non-leaf nodes, the domain region is a rounded rectangle with radius r (see FIG. 5).

When the moving point is outside of the domain region, it can be safely assumed that the moving point's search circle does not intersect with the inner cell, meaning there is no need to search the cell. Only when the moving point is in the domain region does the cell's data need to be searched to find data that is located within the moving point's searching circle, which can be used to speed up the searching process. Split-points are points on the query point's trajectory. The PCRQ result may change only when the query point passes these points. Split-points are divided into two categories—enter split-points and exit split-points.

Figure 6:
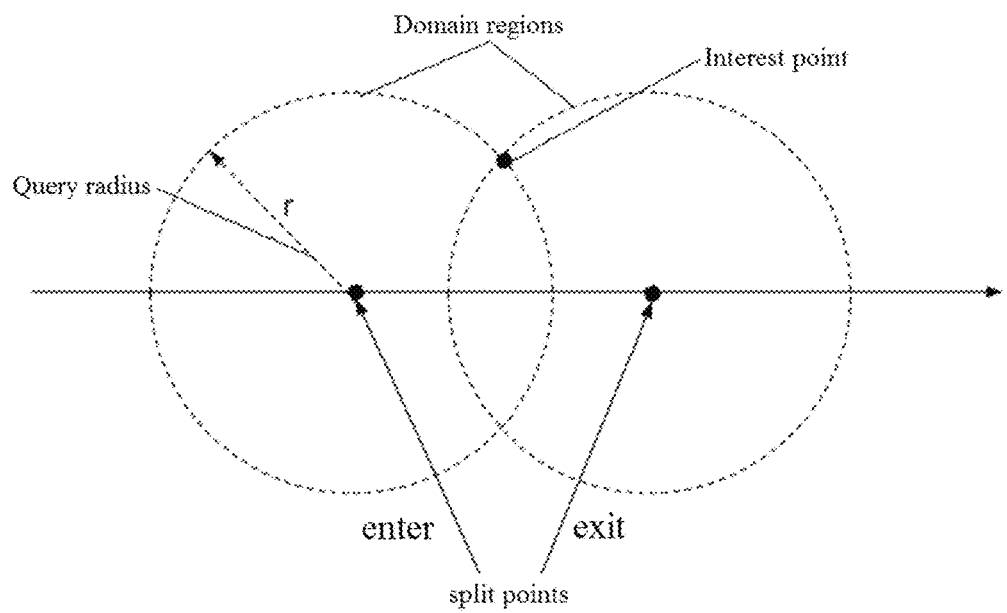
FIG. 6 shows an enter-split-point and exit-split-point in a Progressive CRQ query.

Both an enter split-point and an exit split-point are generated by the intersections of the trajectory of the query point and a domain region of a node, as shown in FIG. 6. For a data point A, when the query point q passes the enter split-point, A enters the query range of q. This can be equivalently stated as q enters the range of A. Conversely, when q passes its exit split-point, A exits the query range of q. When a query point q just passes the enter split-point of arbitrary point p, p is exactly on the border of circle r. When q passes p's enter split-point, p enters range r. Likewise, when q encounters p's exit split-point, p is exactly on the border of the circle with radius r. When q passes p's exit split-point, p exits range r.

One of the advantages of PCRQ of the present invention is that it outputs the result of the CRQ progressively. An important approach to getting the result progressively is the use and generation of split-points. The split-points can be stored in a min-heap of split-points S-Heap. A min-heap is a binary tree structure in which the data contained in each node is less than (or equal to) the data in that node's children. The top of S-Heap has the minimum distance to the query point amongst all split-points in the heap. A tree-like index may be used to reduce the number of elements in S-Heap for PCRQ queries. An R-Tree will be used for the tree-like index to illustrate the concepts of embodiments of the present invention.

Figure 7A:
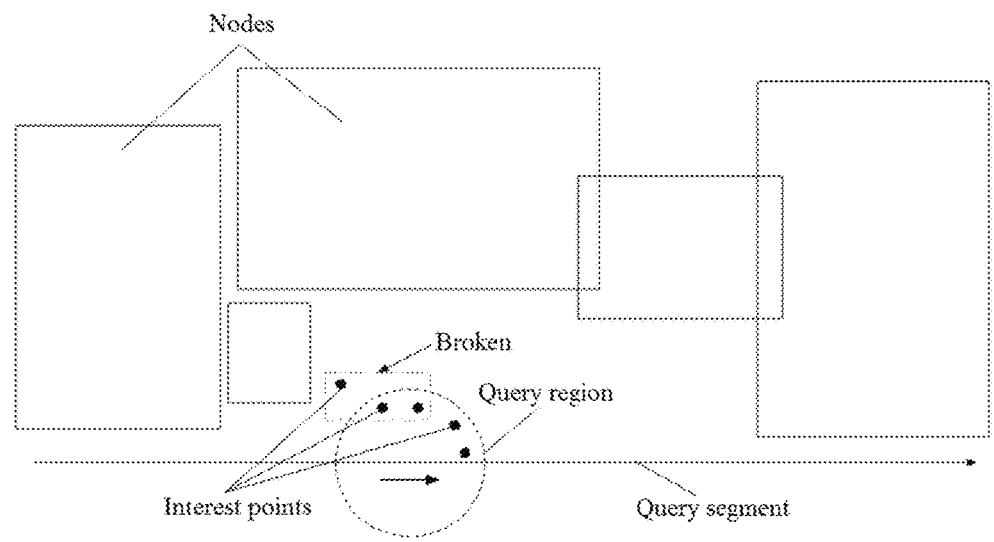
FIG. 7A shows expansion of a Minimum Bounding Rectangle according to an embodiment of the present invention.
Figure 7B:
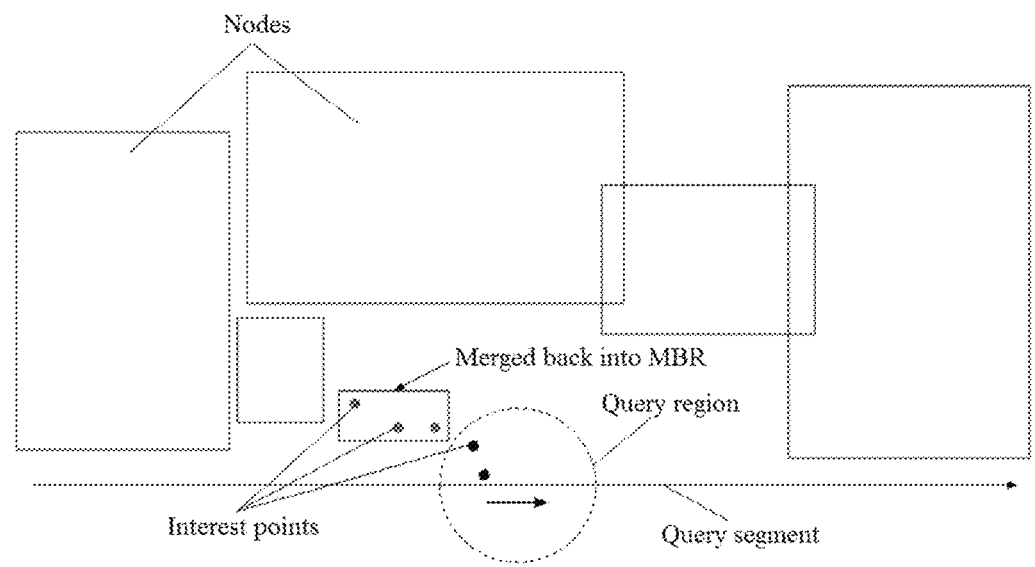
FIG. 7B shows a collapsing process of merging of points back into a Minimum Bounding Rectangle.

Methods of embodiments of the present invention can "merge" the points that have already left the region back into their respective nodes—a process referred to as collapsing. The collapsing process minimizes memory usage and allows embodiments of the present invention to work not only with trajectories that comprise line segments, but also other patterns including curves, loops, etc. In FIG. 7A, the minimum bounding rectangle (MBR) intersecting the query region is broken and two of the points inside are included in the result set. FIG. 7B shows that as the query region moves forward, all the points belonging to the MBR are no longer covered by the query region. After that time, the points will not appear in the result set and can be safely "collapsed" back into the original MBR.

Unlike other methods utilizing an R-tree index based on Euclidean Distance (RED), embodiments of the present invention only need to post one query—a one-time tree traversal for all segments in the path, thereby lowering CPU overhead and memory usage. Traditional RED-based methods are not progressive, which is a characteristic that is in stark contrast to that of the progressive models of embodiments of the present invention. That is, according the present invention, the first result can be reported to the user instantly and the remaining results can gradually be listed in the order of distance or time.

When the result set is very large, the techniques of the embodiments of present invention are particularly beneficial because computing and outputting a large result at one time can be time consuming and require a lot of computing resources. With the methods of prior art, users may be kept waiting for the results for an extended period of time. Furthermore, a user's location could change significantly while waiting for the result pertaining to the previous location, thus possibly making the results irrelevant by the time they are received. Additionally, the techniques of the present invention allow for continuous output of the predictive query results while the query point is moving.

Techniques embodiments of the present invention can find the sequence of all objects, including points and Minimum Bounding Rectangles (MBR), and continuously maintain that sequence. Compared with existing algorithms, the disclosed method has several advantages: (1) Progressiveness—results can be output progressively, which is particular advantageous when the query is expensive (in terms of time and/or computing resources) to execute or the result set is large; (2) Efficiency—the techniques of the embodiments of present invention require a minimal number of nodes be accessed to produce the correct result; (3) Scalability—techniques of the embodiments of present invention can minimize the use of CPU, TO, and memory resources. This is a critical feature for server applications to handle a large number of queries (e.g., large-scale online Location Based Services and related map services and applications on devices with limited CPU and memory, e.g., GPS navigation devices with embedded systems). Furthermore, in the prior art, a moving query point's path generally comprises many small segments and there is a need post a new query for every segment, which is inefficient, whereas the embodiments of present invention only need to post one query for the entirety of the segments in a path; and (4) Any Trajectory—techniques of the embodiments of present invention are not restricted to query trajectories that consist of only line segments, and are capable of handling other query trajectories that consist of curves, loops, and any other shape.

As illustrated in the Figures, embodiments of the present invention provide novel range query resolution methods that output query results in a continuous and progressive manner. Given a query point q moving along some path g, a set of interest points i, and a range r, the subset of said set of stationary interest points is continually returned as result R so that for each pint in the subset, the point's distance to the query point q is less than r at the time of production of said point within the result.

Path g is a set of arbitrary points, wherein each point is a tuple of coordinates. Path g is the trajectory of a query point q represented as a geometric shape, which may be, but is not limited to, a line segment, a polyline, or a curve. Examples of said trajectories are a walking route (or path), a driving route, or a flying route.

A query point or moving object q travels along a path g. The point is a tuple of coordinates at any given time and can represent an object in physical or virtual multidimensional space. For example, the query point can represent a person, an animal, a car, a plane, a smartphone, or a drone. Each point of interest p in i may represent an object of same or different type than that of other points of interest in i. Every interest point p in i is a stationary object (e.g., a gas station, police station, restaurant, hotel, or an objective in a videogame). Range r is a length that represents the radius of q's searching circle, that is, the extent to which interest points are within range of q.

PCRQ result set R can include a set of tuples in which each tuple contains a split-point along with an ordered collection of interest points that are within query point q's searching circle when q is at said split-point. An example is R={<s1, {p23, p50, p11, p9}>, <s2, {p23, p50, p11, p9, p44}>, <s3, {p50, p23, p11, p9, p44}>}. In this example, when query point q passes split-point s1, then p23 is the closest interest point within range, p50 is the next closest interest point within range, and so on. R is progressively returned as q travels along g, possibly returning a different result than what was returned previously. Updating the PCRQ result set consists of inserting a tuple that comprises the split-point that q reached along with the interest points that fall within q's range into the result set or of removing a tuple that comprises the split-point that q reached along with the interest points that fall outside q's range from the result set.

The following are steps that can be applied with PCRQ queries of embodiments of the present invention with the utilization of R-trees. First, branch-and-bound algorithms can be used to index interest points. Initially, the branch-and-bound (BB) range query algorithm can be used to discover the points falling into the query point q's query range or searching circle. A query point's searching circle is a circle centered at said query point with a radius that is equal to r. The nearest enter or exit split points of all entries, including internal nodes and leaf nodes, visited during the regular range query processing are added to S-heap according to their distance to the start point. All the internal nodes and leaf node points that generate no split point are added to a list referred to as a waiting list. The next nearest enter split-point for root node can then be generated. The nearest enter split-point (nearest exit split-point) for a node n is the enter split-point (exit split-point) that is closest to query point q. The next nearest enter split-point (next nearest exit split-point) for a node n is the enter split-point (exit split-point) that is closest to q out of the set of enter split-points (exit split-points) that have not been previously generated for n. Since a query trajectory can consist of loops or curves, the root node (or any node) may enter (exit) range r multiple times throughout the query. As such, only the next nearest enter split-point (exit split-point) needs to be calculated. Subsequent enter split-points (exit split-points) will be calculated in time as it becomes appropriate (e.g., after a node's exit split-point or enter split-point is reached).

The next nearest enter split-point is generated for the root node and inserted to an empty min-heap of split-points S-Heap. Initially, the nearest enter split-point for the root node is the same as its next nearest enter split-point because no enter split-points were previously generated for the root node. S-Heap can be continuously maintained and PCRQ the result set can be reported. S-Heap can consist of exactly one element—the root node's next nearest enter split-point. Both enter and exit split-points contain a pointer or reference to its generating node. If at any point in the PCRQ S-Heap is empty or the distance between query point q and the top of S-Heap is less than or equal to a specified threshold (i.e., q encounters or reaches a split-point), this can be the end of the PCRQ. Alternatively, S-Heap can be continually maintained and the PCRQ result set can be reported until the termination condition is met. That is, when q reaches a split-point, it is popped from S-Heap and the node E that generated the split-point can be retrieved. If the split-point is an enter split-point, E's nearest exit split-point can be generated and added to S-Heap. If E is an internal node, it can be expanded, the next nearest enter split-points can be generated for each of its children, and they can be inserted into S-Heap. If E is a leaf node, the PCRQ result set R can be updated and reported. Assuming the split-point is an exit split-point, if E enters q's searching circle during some point again during the query, E's next nearest enter split-point can be generated inserted into S-Heap. And, if E is an internal node, it can be collapsed (i.e., its children can be removed from N-Buffer, and added to N-Buffer. If E is an interest point, the PCRQ result set R can be updated and reported.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The subject invention includes, but is not limited to, the following exemplified embodiments.

Embodiment 1

A progressive continuous range query (PCRQ) OR a method to evaluate and progressively produce query outputs (commonly referred to as continuous range queries) that are related to a dataset of points of interest, wherein each query references a moving object along a trajectory and requests to report a list of points of interest satisfying and/or sorted by certain criteria, at least one of which criteria references the distance to the actual or expected location of the moving object at the time of evaluation of the query, the method comprising:

(a) applying a branch-and-bound range query algorithm to determine points of interest within a query point's range as the initial result set;

(b) generating a next nearest enter split point for a root node (that is, calculate a first intersection between a domain region of the root node and the query trajectory); wherein the domain region of a node is a region that is generated by expanding a boundary of the root node by a specified range; inserting the generated split point into a min-heap of split points;

(c) obtaining a next split point in the S-heap when a distance between the moving object (i.e., the query point) and the split point is below a given threshold;

(d) retrieving the node that generated the split point before removing the split point from the S-heap, (e) if the split point is an enter split point, generating the node's exit split point (that is, determining the next intersection between the domain region of the node); inserting the generated exit split point into the S-heap, and, if the obtained node is an internal node, expanding the obtained node, and generating the next nearest enter split points for each of its children, and inserting the generated split points into the S-heap; alternatively, if the obtained node is a leaf node, adding the obtained node to a list of points of interest, and reporting the list as a result (to a user);

(f) if the split point is an exit split point (if the obtained node's domain region intersects with the query trajectory at least one more time) determining its next nearest enter split point or exit split point, adding the next nearest enter split point or exit split point to the S-heap; wherein if the obtained node is an internal node, collapsing the internal node by removing the internal node's children from a temporary buffer of nodes, and adding the internal node to the temporary buffer; wherein if the obtained node is a leaf node, removing the leaf node from the list of points of interest, and reporting the list as a result; and (g) repeating steps (c) through (f) until the S-heap is empty or the distance between the moving object (or query point) and next split point in the min-heap exceeds the distance between the query point and the end of the query trajectory.

Embodiment 2

The method of Embodiment 1, wherein the query trajectory is not limited to reposting said range query per segment in the query trajectory (i.e., only one range query is generated per trajectory).

Embodiment 3

The method of any of Embodiments 1 to 2, wherein the query trajectory can be any shape, including, but not limited to, a line segment, a polyline, a curve, and an ellipse.

Embodiment 4

The method of any of Embodiments 1 to 3, wherein the results are continually predicted and maintained considering the query range as a measurement in any (one or more) of the following metrics: time, direct distance, distance of polylines traversable by the moving object (including driving distance or walking distance); and/or a top-k list of results wherein each result entry in the list is one of the top-k incoming interest points.

Embodiment 5

The method of any of Embodiments 1 to 4, wherein each node in the tree-like index that said query point passes is collapsed (i.e., their children entries are removed from said queue), wherein overcoming the typical deficiency of traditional algorithms breaks when the query point traverses a previously-traveled path in reverse (resulting in reducing the amount of memory utilized).

Embodiment 101

A progressive continuous range query (PCRQ) method comprising:
  using branch-and-bound to index interest points with a tree-index;
  generating a nearest enter split point for a root node in the tree-index and adding to min-heap;
  determining whether min-heap has more elements and whether a next split point in min-heap is closer than a destination;
  determining whether a query point has reached a split point;

retrieving an entry that has generated the split point;
removing the split point from min-heap; and
determining whether the split point is an enter split point.

Embodiment 102

The method of Embodiment 101, wherein if the split point is an enter split point, an exit split point is generated and added to min-heap.

Embodiment 103

The method of any of Embodiments 101 to 102, wherein if the entry is a node, the node is expanded by generated children entries' nearest enter split points and adding nearest enter split points to min-heap.

Embodiment 104

The method of any of Embodiments 101 to 103, wherein if the entry is not a node, the entry is added to the result.

Embodiment 105

The method of any of Embodiments 101 to 104, wherein if the split point is not an enter split point, the entry's nearest enter split point is generated and added to min-heap.

Embodiment 106

The method of any of Embodiments 101 to 105, wherein if the entry is a node, it is determined whether the entry has an enter split point in min-heap.

Embodiment 107

The method of any of Embodiments 101 to 106, wherein if the entry does not have (or alternatively, has) an enter split point in S-heap, the entry is collapsed by removing its children entries from a waiting-list and adding the entry to the waiting list.

Embodiment 108

The method of any of Embodiments 101 to 107, wherein if the entry point is not a node, the entry point is removed from the result.

Embodiment 109

The method of any of Embodiments 101 to 108, further comprising determining again whether min-heap has more elements and whether a next split point in min-heap is closer than the destination.

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

Example 1

A user Sam driving in a vehicle with a Global Positioning System (GPS) application installed on his internet-enabled smartphone may inquire about the closest hotels as he embarks on an 18-hour trip between his home in Miami, Fla. and his parents' home in Newark, N.J. As he is driving, he would like to know, in real time, the closest hotels within a 15 mile range.

Using Sam's current geographical location, Sam's driving route and the data indexed in the R-tree index, the service (utilizing techniques of the present invention) determines that there will be 102 hotels close to Sam after he is 9 hours into his trip. The names and locations of the hotels are returned to Sam's GPS app, ordered by their distance to his current location.

Sam decides he will get off the next exit on the highway as he is tired and wants to rest. He looks at his app, which tells him that hotel H is closest to him. However, he also notices on his app that, once he gets off at the next highway exit, hotel E will be closest to him. This information is shown within the app easily and quickly because of the present invention's efficient and progressive re-computation of queries that does not require reposting. Sam instructs the app that he would like to change his destination to hotel E. He then keeps driving along the same route and decides to get off at the aforementioned exit to reach hotel E.

At this point, however, Sam feels hungry. He sees a bright sign that displays the name of his favorite fast-food restaurant chain after he exits, but it is 5 miles in the opposite direction of his previous travels. He turns around and head toward the restaurant. At this point, his app notifies him that there has been a change as he has departed from his original course. Although his route has changed, he still remains on the same path, so the service does not need to regenerate the swap points as they remain the same. Hotel E still remains the closest hotel. Furthermore, an app that implements the present invention can predict gas stations that will be within 1 mile while driving and report and update in real time restaurants within 0.5 miles during a walk from one place to another.

An algorithm has been disclosed in the foregoing for the effective resolution of continuous range queries and returns results in a progressive fashion, i.e. in real time. While the foregoing exemplary embodiment and examples of the present invention have been presented, they do not limit to the scope of the invention and its use cases but serve as illustrations of use cases. That is to say that neither a GPS, database, smartphone, smartphone application, nor any of the technologies in the exemplary embodiment need to be used in the deployment of the present invention. The present invention can be implemented locally, remotely, on an Internet-enabled or non-Internet-enabled personal computer (PC), server, smartphone, any device or equipment, or any combination of the above—all possibly interconnected via a wired or wireless network.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

[1] Guttman, Antonin. R-trees: a dynamic index structure for spatial searching. Vol. 14. No. 2. ACM, 1984.
[2] Sellis, Timos, Nick Roussopoulos, and Christos Faloutsos. "The R+-tree: A dynamic index for multidimensional objects." (1987).
[3] Beckmann, Norbert, et al. The R*-tree: an efficient and robust access method for points and rectangles. Vol. 19. No. 2. ACM, 1990.
[4] Roussopoulos, Nick, Stephen Kelley, and Frederic Vincent. "Nearest neighbor queries." *ACM sigmod record.* Vol. 24. No. 2. ACM, 1995.
[5] Xuan, Kefeng, et al. "Continuous range search query processing in mobile navigation." *Parallel and Distributed Systems, 2008. ICPADS'08. 14th IEEE International Conference on.* IEEE, 2008.
[6] Tao, Yufei, and Dimitris Papadias. "Time-parameterized queries in spatio-temporal databases." *Proceedings of the 2002 ACM SIGMOD international conference on Management of data.* ACM, 2002.
[7] Hjaltason, Gisli R., and Hanan Samet. "Incremental distance join algorithms for spatial databases." *ACM SIGMOD Record.* Vol. 27. No. 2. ACM, 1998.
[8] Bespamyatnikh, Sergei, and Jack Snoeyink. "Queries with segments in Voronoi diagrams." *Computational Geometry* 16.1 (2000): 23-33.
[9] Okabe, Atsuyuki, et al. Spatial tessellations: concepts and applications of Voronoi diagrams. Vol. 501. John Wiley & Sons, 2009.
[10] Tao, Yufei, Dimitris Papadias, and Qiongmao Shen. "Continuous nearest neighbor search." *Proceedings of the 28th international conference on Very Large Data Bases.* VLDB Endowment, 2002.
[11] Lee, Ken C K, et al. "An efficient algorithm for predictive continuous nearest neighbor query processing and result maintenance." *Proceedings of the 6th international conference on Mobile data management.* ACM, 2005.
[12] Mouratidis, Kyriakos, Dimitris Papadias, and Marios Hadjieleftheriou. "Conceptual partitioning: an efficient method for continuous nearest neighbor monitoring." Proceedings of the 2005 ACM SIGMOD international conference on Management of data. ACM, 2005.
[13] Kulik, Lars, and Egemen Tanin. "Incremental rank updates for moving query points." *Geographic Information Science.* Springer Berlin Heidelberg, 2006. 251-268.

What is claimed is:

1. A progressive continuous range query (PCRQ) method, the method being performed by a system comprising a processor and a computer-readable medium having instructions stored thereon that perform the method when executed by the processor, the method comprising:
   using branch-and-bound to index interest points with a tree-index;
   generating a nearest enter split point for a root node in the tree-index and adding to min-heap;
   generating a next nearest enter split point for the root node, a domain region of a node being a region that is generated by expanding a boundary of the root node by a specified range;
   inserting the generated split point into min-heap;
   when the obtained node is an internal node, collapsing the internal node by removing the internal node's children from a temporary buffer of nodes, and adding the internal node to the temporary buffer; and when the obtained node is a leaf node, removing the leaf node from the list of points of interest, and reporting the list as a result;
   determining whether min-heap has more elements and whether a next split point in min-heap is closer than a destination;
   receiving a geographical location of a moving object;
   generating a query point representing the geographical location of the moving object;
   determining whether the query point has reached a split point;
   retrieving an entry that has generated the split point;
   removing the split point from min-heap;
   determining whether the split point is an enter split point; and
   determining again whether min-heap has more elements and whether a next split point in min-heap is closer than the destination.

2. The method of claim 1, further comprising, after determining that the split point is an enter split point, generating an exit split point and adding the exit split point to min-heap.

3. The method of claim 2, further comprising, after determining that the enter split point is a node, expanding the node by generating children entries' nearest enter split points and adding the nearest enter split points to min-heap.

4. The method of claim 1, further comprising, after determining that the enter split point is not a node, adding the enter split point to a result.

5. The method of claim 4, further comprising, after determining that the split point is not an enter split point, generating the entry's nearest enter split point and adding the entry's nearest enter split point to min-heap.

6. The method of claim 4, further comprising, after determining that the entry is a node, determining whether the entry has an enter split point in min-heap.

7. The method of claim 6, further comprising, after determining that the entry does not have an enter split point in S-heap, collapsing the entry by removing the entry's children from a waiting-list and adding the entry to the waiting list.

8. The method of claim 4, further comprising, after determining that the entry is not a node, removing the entry from the result.

9. A progressive continuous range query (PCRQ) method, the method being performed by a system comprising a processor and a computer-readable medium having instructions stored thereon that perform the method when executed by the processor, the method comprising:
   (a) applying a branch-and-bound algorithm to determine points of interest within a query point's range as an initial result set, receiving a geographical location of a moving object, and generating a query point representing the geographical location of the moving object;
   (b) generating a next nearest enter split point for a root node; calculating a first intersection between a domain region of the root node and a query trajectory, the domain region of a node being a region that is generated by expanding a boundary of the root node by a specified range; and inserting the generated split point into a min-heap of split points;
   (c) obtaining a next split point in the S-heap when a distance between the query point and the split point is below a threshold;
   (d) retrieving the node that generated the split point before removing the split point from the S-heap, (e) when the split point is an enter split point, generating the node's exit split point; inserting the generated exit split point into the S-heap and, when the node is an internal node, expanding the internal node, and generating the next nearest enter split points for each of the internal node's children, and inserting the generated split points into the S-heap; and, when the node is a leaf node, adding the node to a list of points of interest, and reporting the list as a result to a user;

(f) when the split point is an exit split point as the node's domain region intersects with the query trajectory at least once, determining a next nearest enter split point or exit split point, and adding the next nearest enter split point or exit split point to the S-heap; and, when the obtained node is an internal node, collapsing the internal node by removing the internal node's children from a temporary buffer of nodes, and adding the internal node to the temporary buffer; and, when the node is a leaf node, removing the leaf node from the list of points of interest, and reporting the list as a result; and (g) repeating steps (c) through (f) until the S-heap is empty or the distance between the query point and next split point in the min-heap exceeds a distance between the query point and an end of the query trajectory, the result being continually predicted and maintained considering the query range as a measurement in one or more of the following metrics: time, direct distance, distance of polylines traversable by the query point, and a top-k list of results in which each result entry in a list is one of the top-k incoming interest points.

10. The method of claim 9, the query trajectory not being limited to reporting said range query per segment in the query trajectory.

11. The method of claim 9, the query trajectory being any shape, including, but not limited to, a line segment, a polyline, a curve, and an ellipse.

12. The method claim 9, further comprising collapsing node in the tree-like index that the query point passes.

13. A progressive continuous range query (PCRQ) method, the method being performed by a system comprising a processor and a computer-readable medium having instructions stored thereon that perform the method when executed by the processor, the method comprising:

using branch-and-bound to index interest points with a tree-index;

generating a nearest enter split point for a root node in the tree-index and adding to min-heap;

generating a next nearest enter split point for the root node, the domain region of a node being a region that is generated by expanding a boundary of the root node by a specified range;

inserting the generated split point into min-heap;

when the obtained node is an internal node, collapsing the internal node by removing the internal node's children from a temporary buffer of nodes, and adding the internal node to the temporary buffer; and when the obtained node is a leaf node, removing the leaf node from the list of points of interest, and reporting the list as a result;

determining whether min-heap has more elements and whether a next split point in min-heap is closer than a destination;

receiving a geographical location of a moving object;

generating a query point representing the geographical location of the moving object;

determining whether the query point has reached a split point;

retrieving an entry that has generated the split point;

removing the split point from min-heap;

determining whether the split point is an enter split point and, when the split point is an enter split point, generating an exit split point that is added to min-heap;

determining whether the enter split point is a node and, when the enter split point is a node, expanding the node by generating children entries' nearest enter split points and adding the nearest enter split points to min-heap; and determining again whether min-heap has more elements and whether a next split point in min-heap is closer than the destination.

* * * * *